(12) United States Patent
Kaneko et al.

(10) Patent No.: US 8,760,724 B2
(45) Date of Patent: Jun. 24, 2014

(54) GRADATION CORRECTION FOR AN IMAGE FORMING APPARATUS

(75) Inventors: Satoshi Kaneko, Kanagawa (JP); Shuji Hirai, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 348 days.

(21) Appl. No.: 12/875,718

(22) Filed: Sep. 3, 2010

(65) Prior Publication Data

US 2011/0063683 A1   Mar. 17, 2011

(30) Foreign Application Priority Data

Sep. 14, 2009 (JP) ................. 2009-211641
Oct. 1, 2009 (JP) ................. 2009-229468

(51) Int. Cl.
*H04N 1/40* (2006.01)
*G06K 15/00* (2006.01)
*G03G 15/00* (2006.01)

(52) U.S. Cl.
USPC .............. 358/3.01; 358/3.1; 399/49

(58) Field of Classification Search
CPC .................................. G03G 15/5025
USPC .................................... 358/3.01
See application file for complete search history.

(56) References Cited

U.S. PATENT DOCUMENTS

| 5,461,462 | A * | 10/1995 | Nakane et al. .................. 399/15 |
| 5,712,930 | A * | 1/1998 | Watanabe .................... 382/270 |
| 6,757,512 | B2 | 6/2004 | Miyawaki et al. |
| 6,975,338 | B2 | 12/2005 | Hirai et al. |
| 7,151,901 | B2 | 12/2006 | Hirai |
| 7,193,642 | B2 | 3/2007 | Hirai et al. |
| 7,203,452 | B2 | 4/2007 | Miyawaki et al. |
| 7,343,126 | B2 | 3/2008 | Miyawaki et al. |
| 7,693,466 | B2 | 4/2010 | Miyawaki et al. |
| 2001/0048530 | A1 * | 12/2001 | Hayashi et al. ............. 358/1.13 |
| 2002/0154829 | A1 * | 10/2002 | Tsukioka .................... 382/254 |

(Continued)

FOREIGN PATENT DOCUMENTS

EP   1 152 597 A2   11/2001
JP   9-6070 A   1/1997

(Continued)

OTHER PUBLICATIONS

The Extended European Search Report issued Jun. 16, 2011, in Application No. 10175758.1-1228 / 2299686.

(Continued)

*Primary Examiner* — Benny Q Tieu
*Assistant Examiner* — Daryl Jackson
(74) *Attorney, Agent, or Firm* — Oblon, Spivak, McClelland, Maier & Neustadt, L.L.P.

(57) ABSTRACT

There is provided an image forming apparatus that performs gradation correction, including a pattern forming unit that forms, on an image carrier, rows of area coverage modulation patterns having patterns of different gradation values in steps by area coverage modulation method; a toner adhering amount detecting unit that measures toner adhering amount of each pattern of the rows of area coverage modulation patterns formed by the pattern forming unit, the gradation correction being performed based on a detection result of the toner adhering amount detecting unit; and a pattern type selecting unit that selects a single pattern type formed on the image carrier from a plurality of pattern types, when carrying out gradation correction control by forming the rows of the area coverage modulation.

15 Claims, 14 Drawing Sheets

(56) References Cited

U.S. PATENT DOCUMENTS

| | | |
|---|---|---|
| 2005/0025509 A1* | 2/2005 | Ooki et al. ............... 399/49 |
| 2005/0286916 A1 | 12/2005 | Nakazato et al. |
| 2006/0164700 A1* | 7/2006 | Hayashi ................. 358/518 |
| 2006/0239705 A1* | 10/2006 | Ishibashi ................ 399/49 |
| 2007/0097439 A1* | 5/2007 | Yamada ................. 358/3.1 |
| 2007/0147929 A1* | 6/2007 | Ishimoto et al. ......... 400/62 |
| 2008/0075476 A1 | 3/2008 | Nakazato et al. |
| 2008/0144975 A1* | 6/2008 | Shibaki et al. ......... 382/299 |
| 2008/0151278 A1* | 6/2008 | Sekiguchi et al. ....... 358/1.9 |
| 2008/0205923 A1 | 8/2008 | Takeuchi et al. |
| 2008/0253793 A1 | 10/2008 | Ishibashi et al. |
| 2009/0110413 A1 | 4/2009 | Takeuchi et al. |
| 2009/0116073 A1* | 5/2009 | Nakamura .............. 358/3.23 |
| 2009/0141310 A1* | 6/2009 | Matsuoka .............. 358/3.06 |
| 2009/0208233 A1 | 8/2009 | Hirai |
| 2009/0231645 A1* | 9/2009 | Hayashi ................. 358/520 |
| 2009/0324267 A1 | 12/2009 | Yoshida et al. |
| 2010/0033743 A1 | 2/2010 | Hirai |

FOREIGN PATENT DOCUMENTS

| | | |
|---|---|---|
| JP | 9-146420 A | 6/1997 |
| JP | 2003-270868 | 9/2003 |
| JP | 2004-64358 | 2/2004 |
| JP | 2004-88257 | 3/2004 |
| JP | 3667971 | 4/2005 |
| JP | 2005-275128 A | 10/2005 |
| JP | 2007-006204 | 1/2007 |
| JP | 2007-199304 | 8/2007 |

OTHER PUBLICATIONS

Japanese Office Action mailed Jun. 11, 2013 in Japanese Application No. 2009-229468.

Office Action issued Oct. 8, 2013 in Japanese Patent Application No. 2009-229468.

* cited by examiner

DOT-TYPE

LINE-TYPE

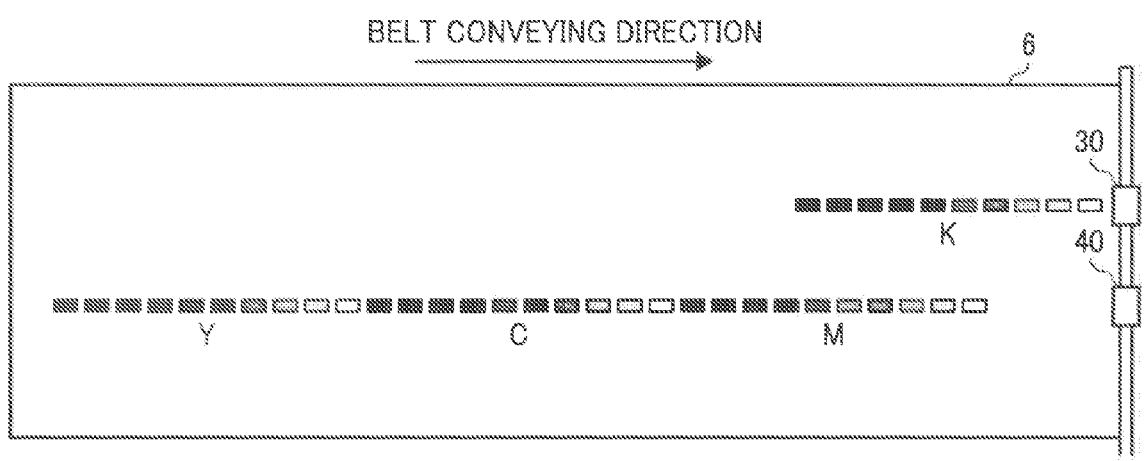

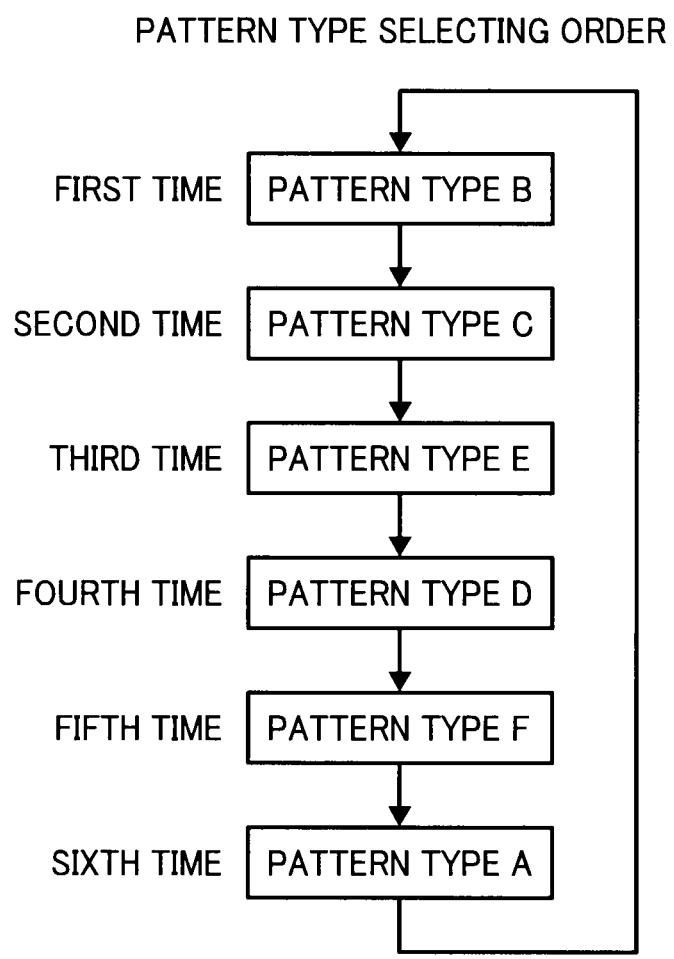

GRADATION CORRECTION FOR AN IMAGE FORMING APPARATUS

CROSS-REFERENCE TO RELATED APPLICATIONS

The present application claims priority to and incorporates by reference the entire contents of Japanese Patent Application No. 2009-211641 filed in Japan on Sep. 14, 2009 and Japanese Patent Application No. 2009-229468 filed in Japan on Oct. 1, 2009.

BACKGROUND OF THE INVENTION

1. Field of the Invention

The present invention relates to an image forming apparatus that performs gradation correction control by forming and detecting rows of area coverage modulation patterns having patterns of different gradation values in steps by area coverage modulation method.

2. Description of the Related Art

In electrophotographic image forming apparatuses, gradation is expressed by area coverage modulation method for expressing pseudo-density by varying an area ratio of toner adhering region. Most of image forming apparatuses have several pattern types to match the image quality desired by the user and selectively use them for different types of output images. For example, dot-type patterns are used to express strings of characters, while line-type patterns in which a phenomenon such as a moire is not likely to appear are used to express gradation for photographs and the like for which more importance is placed on the gradation such as shades of colors. These pattern types have different gradation characteristics. Accordingly, when the gradation characteristics are changed by changes in operating environment such as temperature and humidity and changes of each image forming unit over time, it becomes necessary to correct the gradation characteristics for each of the pattern types.

Conventionally, for the gradation correction of each pattern type, a gradation correction method by reading density information of rows of area coverage modulation patterns formed on a paper sheet with a scanner and by feeding it back to an image forming unit to correct the gradation characteristics has been used. However, because it requires manual operation of reading the rows of area coverage modulation patterns formed on the paper with the scanner, when to perform gradation correction is left to a user or service personnel to decide. In addition, such operation of gradation correction is cumbersome for users. Consequently, a gradation correction method that automatically performs the gradation correction and stabilizes gradation characteristics is desired.

Japanese Patent Application Laid-open No. 2003-270868 discloses that gradation characteristics are corrected based on density information by receiving the information of pattern type set in a print controlling unit and forming patches of the same pattern type for gradation correction. However, when image signals of different pattern types are frequently received, it is not possible to correct the gradation characteristics for all the pattern types and thus, the difference in image quality may become large depending on the pattern types. The disclosure describes that when the pattern type is changed, the gradation correction is performed in response to the pattern type changed. In this method, the correction is performed every time the pattern type is changed, thereby increasing the waiting time of the user.

Japanese Patent Application Laid-open No. 2004-88257 discloses that the number of patterns for rows of area coverage modulation patterns to be formed in an image forming apparatus is changed based on pattern types. For example, a smaller number of patterns is used for the pattern types applied to font objects that are relatively less critical to shades of colors, while the number of patterns that obtains correction accuracy comparable to conventional ones is used for the pattern types applied to the objects for which more importance is placed on shades of colors. Generally, the larger the number of patterns for gradation correction is, the more accurate gradation characteristics are obtained. However, to shorten the time required for the correction, a method is used to approximate the gradation characteristics from the detection result of a smaller number of patterns. For this reason, in the disclosed method, the approximated gradation characteristics changes depending on the number of patterns and thus, the gradation stability may not be maintained.

Furthermore, because the gradation correction is performed by forming a plurality of pattern types, the time which takes for the gradation correction becomes longer, thereby increasing the waiting time of the user.

Japanese Patent Application Laid-open No. 2004-64358 discloses that gradation correction is performed by forming on an image carrier rows of area coverage modulation patterns of two or more pattern types for gradation correction control and by selecting a gradation table to correct depending on an operating condition of the apparatus. The operating condition here in the disclosure is triggered at start-up of the apparatus, for every predetermined number of printouts, and the like. In this method, however, the pattern type that the user is to use and the pattern type to which the gradation correction is performed may differ and thus, the effect of gradation correction for the desired pattern type may not be obtained. Additionally, the rows of area coverage modulation patterns of two or more pattern types are formed on the image carrier to detect density information, which leads to a problem in that the time required for the gradation correction is long.

While image forming apparatuses of recent years are required to provide output images of high quality with a bare minimum of image quality adjustment time, in general, the image quality adjustment time and the image quality are in the relation of trade off. Because the user cannot perform any printing during the operation of image quality adjustment, it is preferable that the time required for image quality adjustment be shorter. On the other hand, the demand for image quality is ever increasing. Accordingly, it is inevitable to appropriately correct various characteristics relating to image quality such as gradation characteristics to maintain gradation stability.

SUMMARY OF THE INVENTION

It is an object of the present invention to at least partially solve the problems in the conventional technology.

According to an aspect of the present invention, there is provided an image forming apparatus that performs gradation correction, including a pattern forming unit that forms, on an image carrier, rows of area coverage modulation patterns having patterns of different gradation values in steps by area coverage modulation method; a toner adhering amount detecting unit that measures toner adhering amount of each pattern of the rows of area coverage modulation patterns formed by the pattern forming unit, the gradation correction being performed based on a detection result of the toner adhering amount detecting unit; and a pattern type selecting unit that selects a single pattern type formed on the image carrier from a plurality of pattern types, when carrying out gradation correction control by forming the rows of the area coverage modulation patterns.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a schematic diagram for explaining a layout of rows of area coverage modulation patterns;

FIG. 12 is a schematic diagram for explaining an example of pattern selecting method;

DETAILED DESCRIPTION OF THE PREFERRED EMBODIMENTS

Exemplary embodiments of the present invention will be explained with reference to accompanying drawings below.

Figure 1:
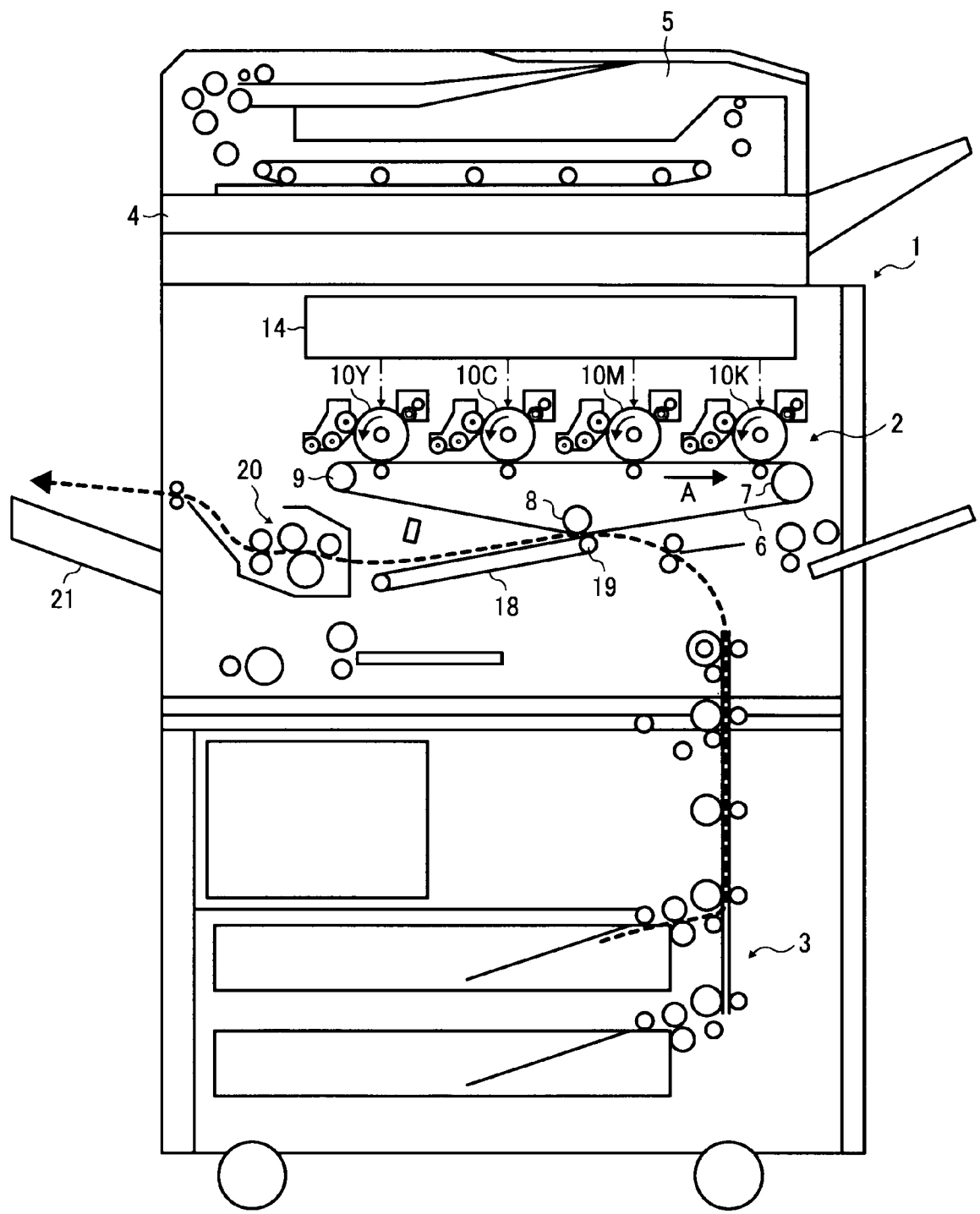
FIG. 1 is a schematic diagram illustrating an example of an image forming apparatus according to the present invention.
Figure 2:
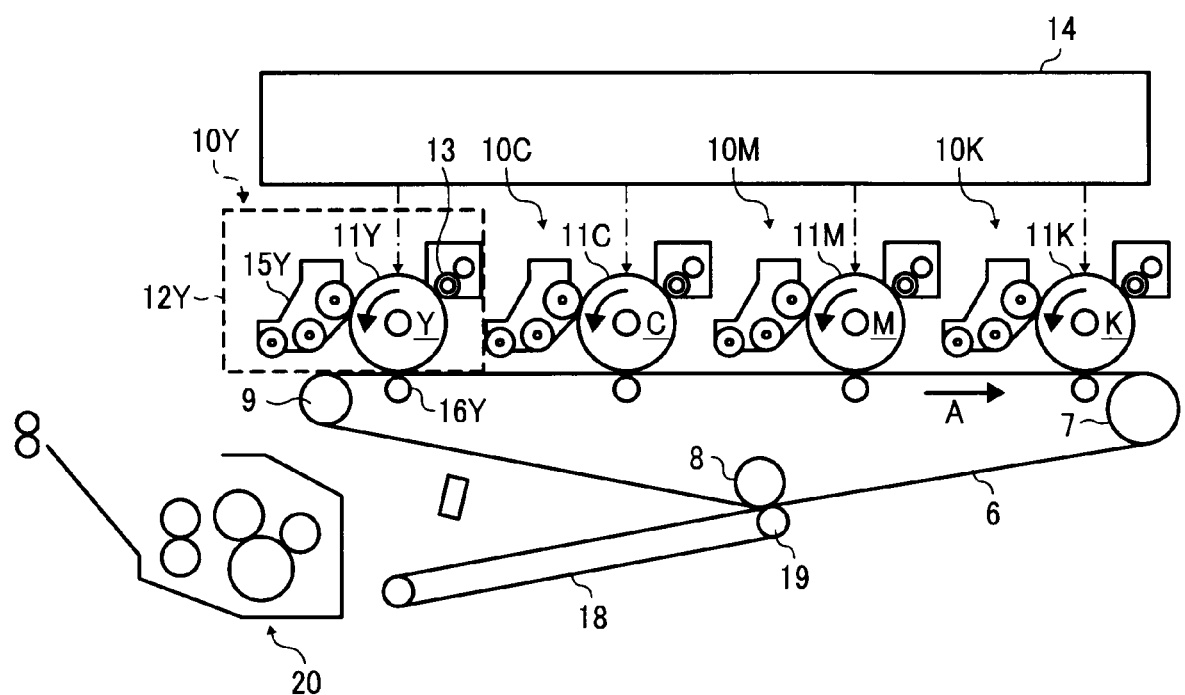
FIG. 2 is a schematic diagram illustrating a structure of an image forming unit of the image forming apparatus.

FIG. 1 is a schematic diagram illustrating an example of an image forming apparatus according to one embodiment of the present invention. FIG. 2 is a schematic diagram illustrating an image forming unit in the image forming apparatus. This image forming apparatus 1 illustrated has an image forming unit 2 that forms images on recording paper, a sheet feeder 3 that feeds recording paper to the image forming unit 2, a scanner 4 that reads original images, an automatic document feeder 5 that automatically feeds the original to the scanner 4, and the like.

The image forming unit 2 is arranged with a drive roller 7, a secondary transfer backup roller 8, and a follower roller 9 wound with an endless intermediate transfer belt 6 that is rotatably driven in the arrow A direction by the rotation of the drive roller 7. The intermediate transfer belt 6 is made of a material of polyimide resin that hardly stretches with carbon powder dispersed therein to adjust the electrical resistance thereof.

The image forming unit 2 has process cartridges 10Y, 100, 10M, and 10K for colors of yellow, cyan, magenta, and black arranged facing the intermediate transfer belt 6. The process cartridges 10Y to 10K have image supporting bodies 11Y, 11C, 11M, and 11K, respectively, each configured as a photosensitive element in a drum shape where a toner image of a different color is formed. The toner image formed on each image carrier is transferred on a recording medium conveyed by the intermediate transfer belt 6 being overlaid one on top of the other. In place of the image carrier in a drum shape, an image carrier made of an endless belt may be used.

The structures of the process cartridges 10Y to 10K that form toner image on each of the image supporting bodies 11Y to 11K and that transfer the toner image thereon to the intermediate transfer belt 6 are substantially the same except for the color of toner image being different. Therefore, the structure of only a first process cartridge 10Y forming toner image on the image carrier 11Y and transferring the image to the intermediate transfer belt 6 will be explained.

The image carrier 11Y of the process cartridge 10Y is rotatably supported on a cartridge case 12Y, and is rotatably driven in the counter-clockwise direction by a driving device not illustrated. In this case, a charging device composed of a charging roller 13 rotatably supported on the cartridge case 12Y is applied with a charging voltage, which charges the surface of the image carrier 11Y in a predetermined polarity. The charging roller 13 constitutes an example of a charging device that charges the image carrier.

The image carrier 11Y charged is irradiated with a light-modulated laser beam output from an optical writing unit 14 separate from the process cartridge 10Y, which forms an electrostatic latent image on the image carrier 11Y. The electrostatic latent image thus formed is visualized as a yellow toner image by a developing device 15. As for the optical writing unit 14 in the present embodiment, the one that performs light scanning with a laser beam output from a semiconductor laser being deflected by a polygon mirror not illustrated and further reflected by a reflective mirror and passed through an optical lens not illustrated is used. In place of the one with such structure, a unit that performs light scanning with an LED array may be used.

On the opposite side of the process cartridge 10Y, a primary transfer roller 16 is disposed with the intermediate transfer belt 6 therebetween. Applying a transfer voltage to the primary transfer roller 16 allows the toner image on the image carrier 11Y to be primary-transferred onto the intermediate transfer belt 6 that is rotatably driven in the arrow A direction. The residual toner on the image carrier 11Y after transferring the toner image is scraped off and removed by a cleaning device not illustrated.

In the same manner, on a second image carrier 11C, a third image carrier 11M, and a fourth image carrier 11K illustrated in FIG. 1, a cyan toner image, a magenta toner image, and a black toner image are formed, respectively. These toner images are primary-transferred sequentially one on top of the other onto the intermediate transfer belt 6 where the yellow toner image is transferred, to form a combined toner image on the intermediate transfer belt 6.

The sheet feeder 3 disposed under the image forming unit 2 supplies a recording medium, and the recording medium supplied by the sheet feeder 3 is fed between the intermediate transfer belt 6 at the position of the secondary transfer backup roller 8 and a transfer conveying belt 18 at the position of an opposing secondary transfer roller 19 by a registration roller pair 17 at a predetermined timing. In this case, the secondary transfer roller 19 is applied with a predetermined transfer voltage, thereby secondary-transferring the combined toner image on the intermediate transfer belt 6 onto the recording medium.

The recording medium with the secondary-transferred combined toner image thereon is conveyed further upwards passing through a fixing device 20. In this case, the toner image on the recording medium is fixed by the action of heat and pressure. The recording medium passing through the fixing device 20 is delivered to a catch tray 21 located outside of the apparatus. The residual toner adhered on the intermediate transfer belt 6 after transferring the toner image is removed by a cleaning device (not illustrated).

The apparatus is provided with a non-volatile memory not illustrated, and the non-volatile memory stores therein various information, such as outputs of various sensors, results of correction control, and frequencies of pattern types used in each print job.

The image data processing performed in the image forming apparatus will now be explained.

The image processing and signal processing rendered to turn the input image data into a laser drive signal in the optical writing unit 14 will be schematically explained.

Figure 3:
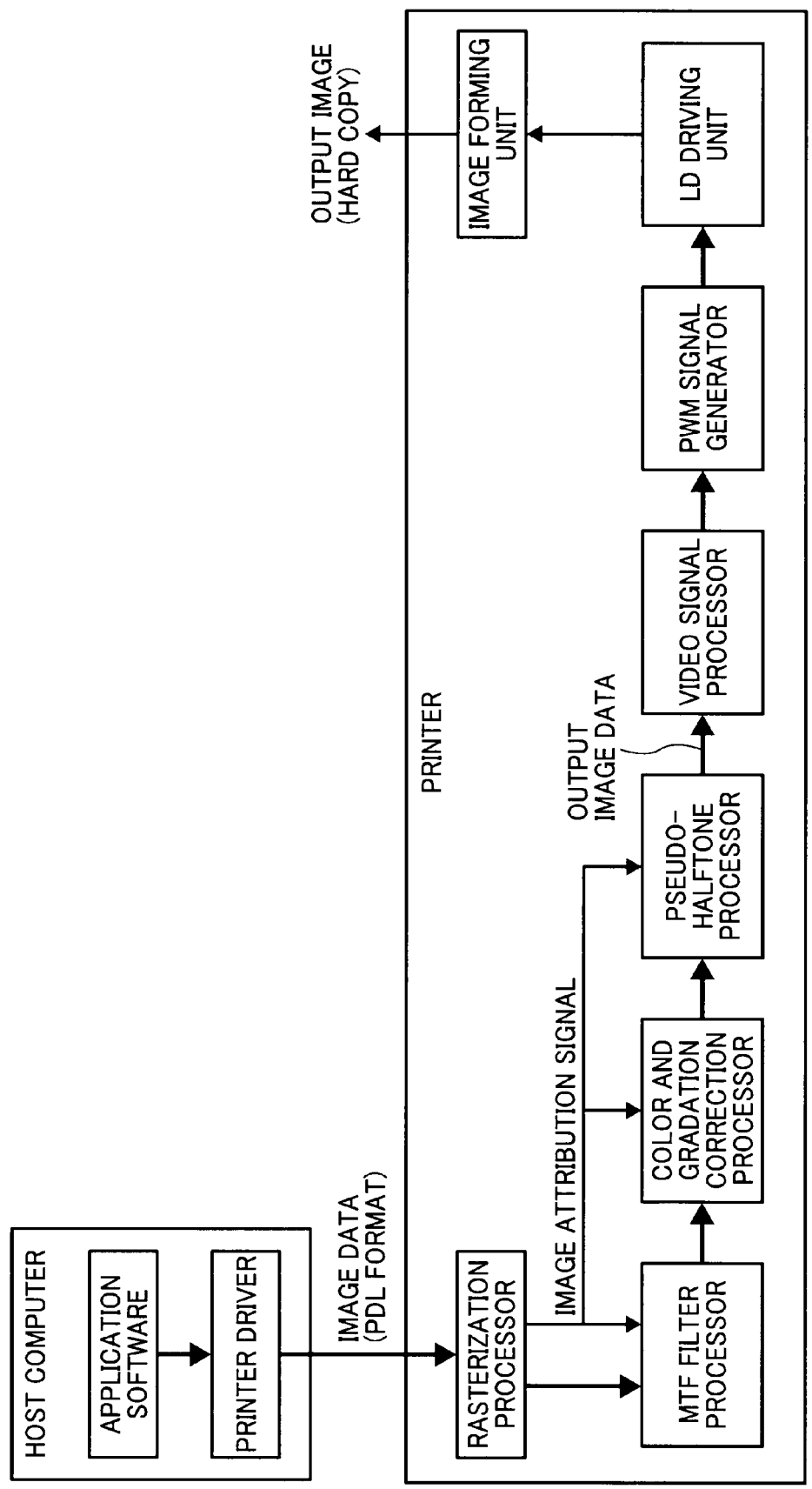
FIG. 3 is a block diagram illustrating a flow of image data processing in the image forming apparatus according to one embodiment of the present invention.

FIG. 3 is a block diagram illustrating a flow of the image data processing performed in the image forming apparatus according to the present embodiment.

In FIG. 3, when image data written in page description language (PDL) is input as input data from a host computer to the image forming apparatus, a rasterization processor interprets the data and forms a raster image. In this case, for each object, category signals for characters, lines, photographs, graphic images, or the like, and their attribution signals are generated and output to an MTF filter processor, a color correction and gradation correction (hereinafter, "color and gradation correction") processor, a pseudo-halftone processor, and the like. The MTF filter processor carries out an emphasizing process for each attribution by selecting an optimal filter in response to the attribution signal sent from the rasterization processor. The method of the MTF filtering process is the same as that of the conventional technology and thus, the detailed explanation is omitted. The image data after the MTF filtering process is delivered to the color and gradation correction processor for the following step.

The color and gradation correction processor carries out color conversion from RGB color space that is the color space of PDL received from the host computer into CMYK color space that is the color space composed of toner colors used in an image forming unit using an optimal color correction coefficient for each attribution in response to the attribution signal sent from the rasterization processor, and further carries out various correction processes such as gradation correction. The method of the color and gradation correction process is the same as that of the conventional technology and thus, the detailed explanation is omitted.

Subsequent to the process performed in the color and gradation correction processor, the image data is delivered to the pseudo-halftone processor. The pseudo-halftone processor carries out a pseudo-halftone process and generates data for an output image. The output image data is sent to a laser driving unit via a video signal processor and a PWM signal generator to drive the laser driving unit. In the present embodiment, for the color and gradation corrected data, the pseudo-halftone process is carried out by a dither method. More specifically, by comparing with a dither matrix stored in advance, quantization is performed.

Figure 4A:
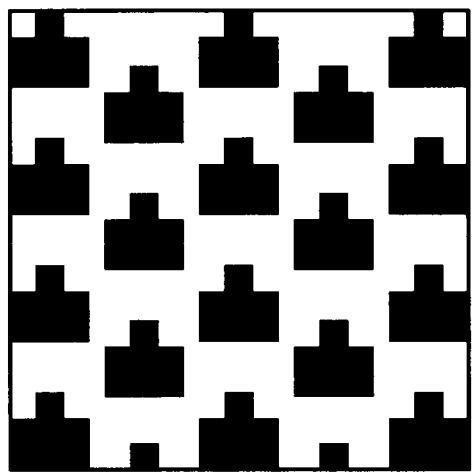
FIGS. 4A and 4B are schematic diagrams illustrating examples of typical pattern types, FIG. 4A depicting a dot-type pattern type and FIG. 4B depicting a line-type pattern type.
Figure 4B:
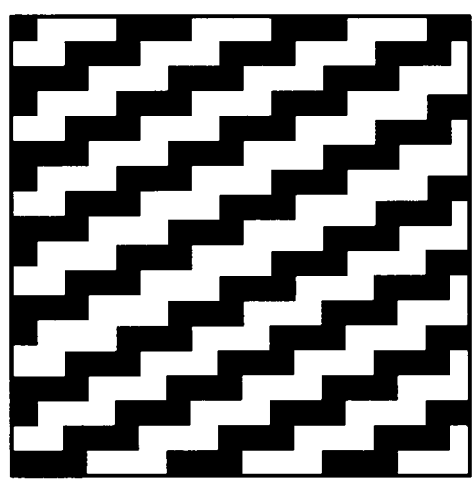

FIGS. 4A and 4B depict examples of typical pattern types for area coverage modulation, FIG. 4A depicting a dot-type pattern type and FIG. 4B depicting a line-type pattern type. A dither matrix set with an optimal number of lines and optimal screen angles is selected in response to the attribution signal sent from the rasterization processor, whereby an optimal pseudo-halftone process is carried out. It is known that the gradation characteristics vary depending on the pattern types.

Toner adhering amount detecting sensors in the image forming apparatus according to the present embodiment will be explained.

Figure 5A:
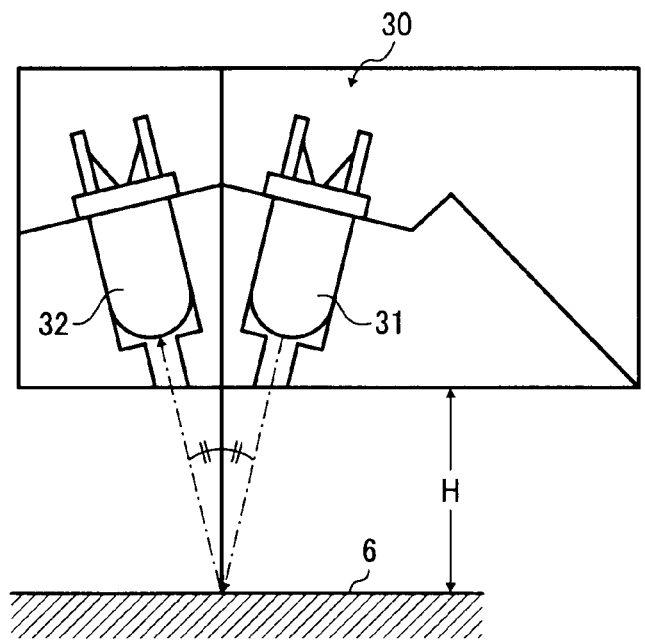
FIGS. 5A and 5B are schematic diagrams illustrating toner adhering amount detecting sensors, FIG. 5A depicting a black toner adhering amount detecting sensor and FIG. 5B depicting a color toner adhering amount detecting sensor.
Figure 5B:
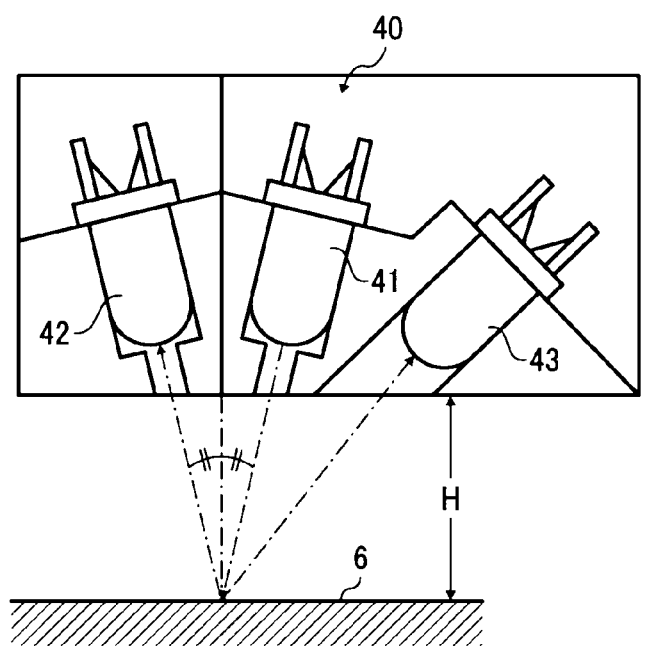

FIGS. 5A and 5B are schematic diagrams illustrating the toner adhering amount detecting sensors, FIG. 5A depicting the structure of a black toner adhering amount detecting sensor 30 and FIG. 5B depicting the structure of a color toner adhering amount detecting sensor 40. The black toner adhering amount detecting sensor 30, as illustrated in FIG. 5A, is configured with a light-emitting element 31 composed of a light-emitting diode (LED) or the like, and a light-receiving element 32 that receives specularly reflected light. The light-emitting element 31 irradiates the intermediate transfer belt 6 with light, and the light radiated is reflected by the intermediate transfer belt 6. The light-receiving element 32 receives the specularly reflected light out of the reflected light.

Meanwhile, the color toner adhering amount detecting sensor 40, as illustrated in FIG. 5B, is configured with a light-emitting element 41 composed of an LED or the like, a light-receiving element 42 that receives specularly reflected light, and a light-receiving element 43 that receives diffusely reflected light. The light-emitting element 41, similarly to the black toner adhering amount detecting sensor, irradiates the intermediate transfer belt 6 with light, and the light radiated is reflected by the surface of the intermediate transfer belt 6. The specularly-reflected-light receiving element 42 receives the specularly reflected light out of the reflected light, while the diffusely-reflected-light receiving element 43 receives the diffusely reflected light out of the reflected light. In the present embodiment, as for the light-emitting element 41, a GaAs infrared LED that emits light at a peak wavelength of 950 nanometers is used and, as for the light-receiving elements 42 and 43, Si photo transistors or the like having a peak light-receiving sensitivity of 800 nanometers are used. However, the ones with a different peak wavelength and different peak light-receiving sensitivity may be used. The black toner adhering amount detecting sensor 30 and the color toner adhering amount detecting sensor 40 are arranged with widths H of about 5 millimeters (detecting distance) between themselves and the surface of the intermediate transfer belt 6 that is a detecting target. In the present embodiment, the toner adhering amount detecting sensors are provided near the intermediate transfer belt 6 and an image forming condition is determined based on the toner adhering amount on the intermediate transfer belt 6. However, the toner adhering amount detecting sensors may be provided on the image carrier 11 or the transfer conveying belt 18.

The correction control characterizing the present embodiment will be explained. Because various characteristics of images formed by an electrophotographic system fluctuate by changes in surrounding environment and changes over time, controls to correct the various characteristics are performed. In the image forming apparatus according to the present embodiment, process control to ensure a target toner adhering amount for each color is performed when the power is turned on or when a predetermined number of sheets are fed through. In the process control, by sequentially switching charging bias and developing bias at appropriate timings, gradation patterns (hereinafter, P patterns) for each color are formed on the intermediate transfer belt, and the adhering amount of these P patterns is then detected by the toner adhering amount detecting sensor to convert an output voltage of the sensor to the adhering amount. Based on the detected result of the adhering amount, the control to change developing bias value and toner density control target value is performed so that a target adhering amount is obtained. With the assumption of the apparatus being in a condition in that the target toner adhering amount is assured by such control, the control to correct gradation characteristics will be explained.

Figure 6:
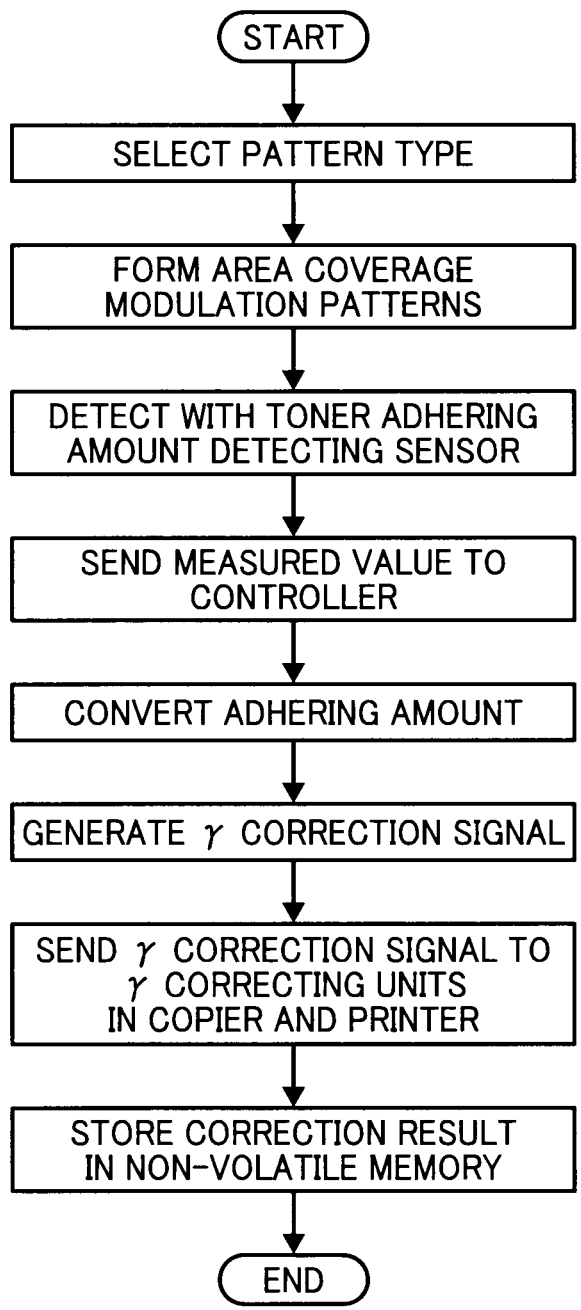
FIG. 6 is a flowchart illustrating gradation correction according to the one embodiment.
Figure 7:
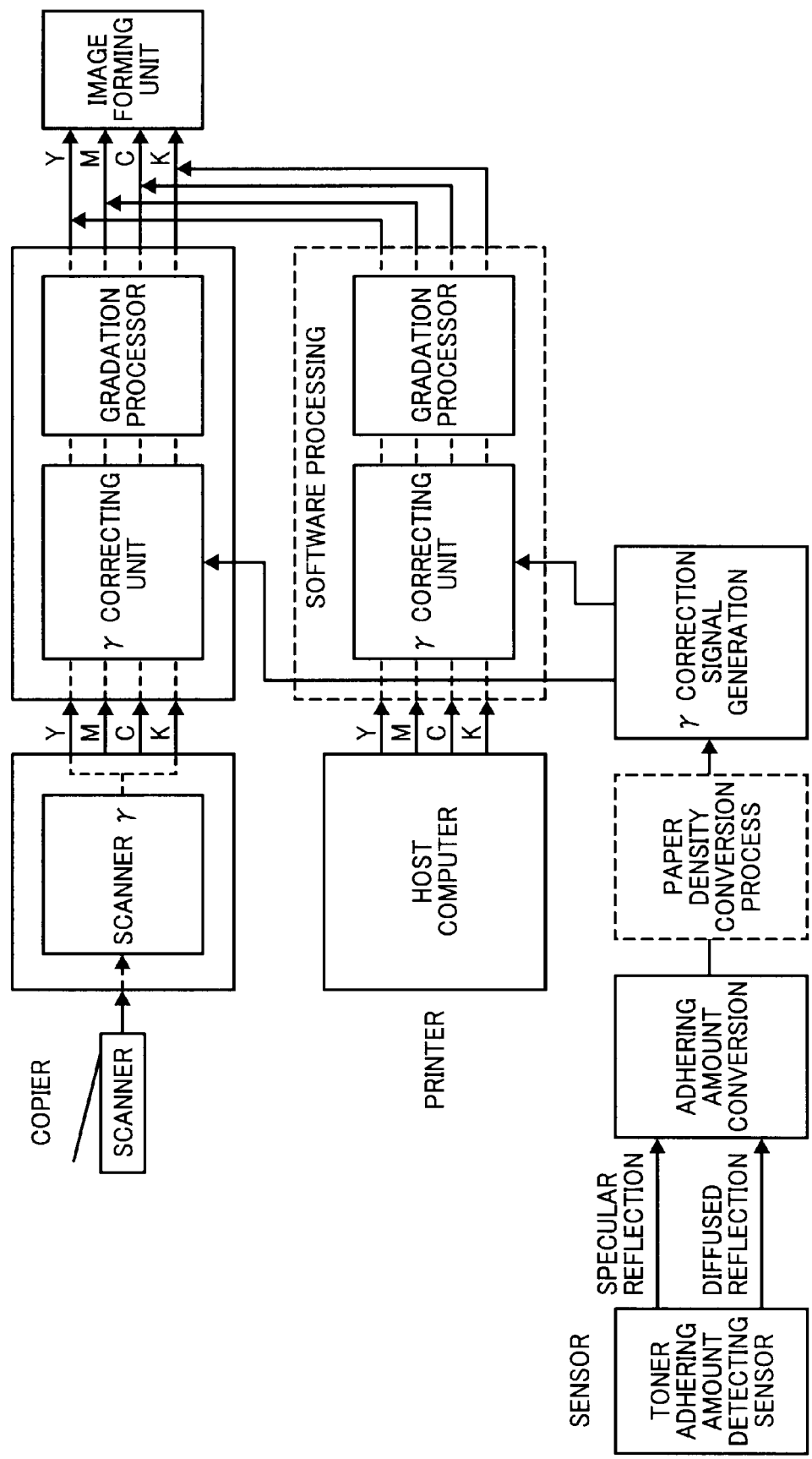
FIG. 7 is a schematic block diagram of gradation correction control according to the one embodiment.

The gradation correction control is performed after the process control is finished. FIG. 6 is a flowchart illustrating the gradation correction according to the present embodiment, and FIG. 7 is a schematic diagram of the gradation correction control according to the present embodiment. The image forming apparatus according to the present embodiment has a copier section and a printer section, each having a γ-correcting unit. As illustrated in FIG. 7, a γ-correction signal generated based on the detected result of rows of area coverage modulation patterns corrects the γ-correcting units in the copier section and the printer section. Such configuration makes it possible to keep gradation stability for both inputs to the copier section and the printer section.

Figure 8:
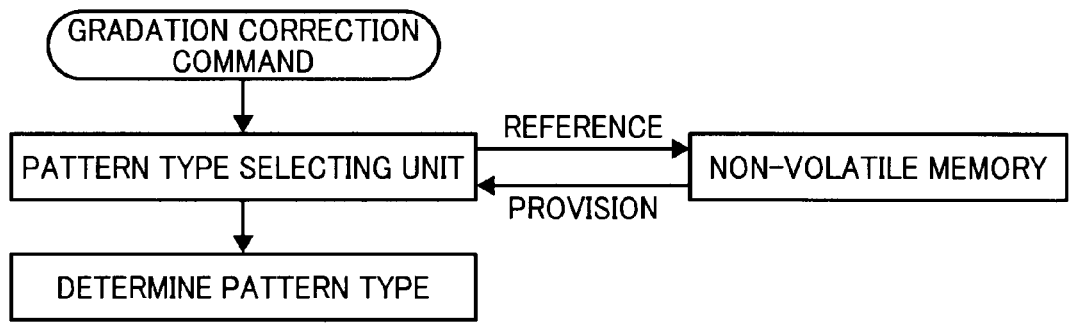
FIG. 8 is a block diagram illustrating pattern selecting operation.

At the step of "SELECT PATTERN TYPE" indicated in FIG. 6, a single pattern type is selected from the pattern types to correct based on the information stored in the non-volatile memory. FIG. 8 is a schematic diagram illustrating the operation of pattern type selection. As illustrated in FIG. 8, a pattern type selecting unit receives a gradation correction command, accesses the non-volatile memory, and determines the pattern type to correct based on the information of each pattern type.

Figure 9:
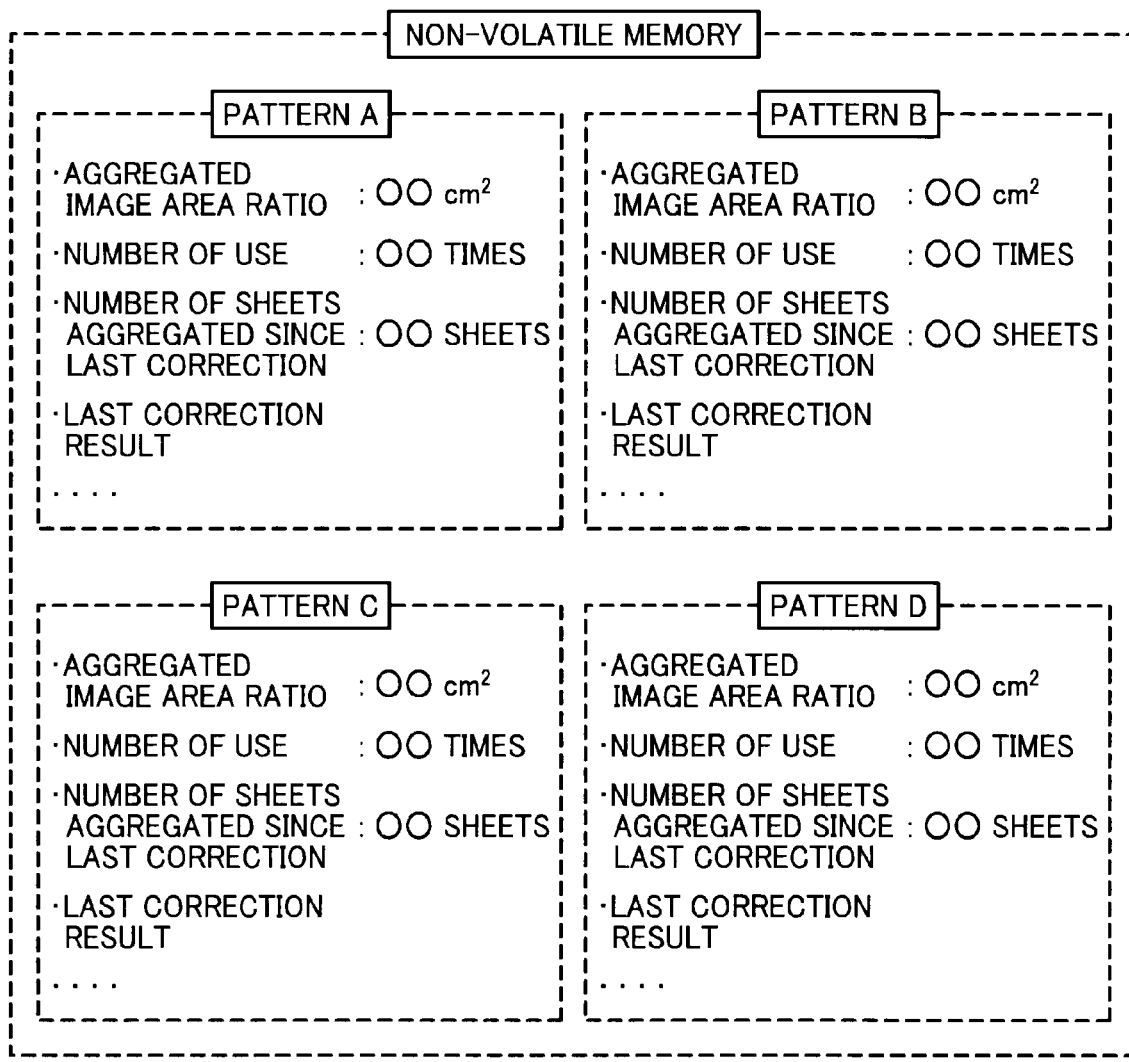
FIG. 9 is a schematic diagram for explaining information of pattern types stored in a non-volatile memory.

The non-volatile memory, as illustrated in FIG. 9, stores therein the information for each of the pattern types such as aggregated image area ratio, the number of uses, and the number of sheets aggregated after the last correction control. In the present embodiment, a single pattern type is determined as a correction target by referring to the non-volatile memory for the pattern type of the image area ratio most frequently used in the print jobs after the last correction control is finished. However, the pattern type may be the most used pattern type in the number of print jobs aggregated.

With the pattern type selected, rows of area coverage modulation patterns in 10 gradation scales for each color are formed on the intermediate transfer belt. In the image forming apparatus according to the present embodiment, because single pieces of the black toner adhering amount detecting sensor and the color toner adhering amount detecting sensor are disposed juxtaposed in the main scanning direction, the rows of area coverage modulation patterns are formed in a layout as illustrated in FIG. 10. In the present embodiment, while the number of gradation scales for the rows of area coverage modulation patterns is defined as 10 gradation scales for each color, the number of gradation scales may be increased or decreased from 10 gradation scales depending on the correction accuracy required because the correction accuracy differs depending on the apparatus.

With each of the toner adhering amount detecting sensors, the specularly reflected light and the diffusely reflected light from each patch of patterns in the rows of area coverage modulation patterns formed are detected. The output voltage for each patch detected is converted to the adhering amount, and the current gradation characteristics are calculated. Based on the gradation characteristics, a γ-correction signal used to obtain the target toner adhering amount is generated, and the γ-correction signal is fed back to the respective γ-correction units in the copier section and the printer section to correct the gradation. The result of correction is stored in the non-volatile memory to finish the gradation correction.

Figure 11A:
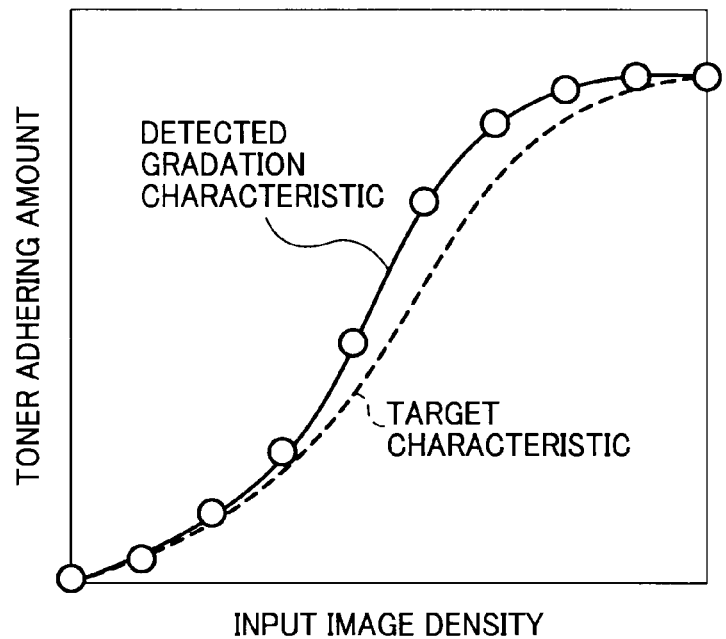
FIGS. 11A and 11B are graphs illustrating examples of gradation characteristics, FIG. 11A depicting those before correction and FIG. 11B depicting those after the correction.
Figure 11B:
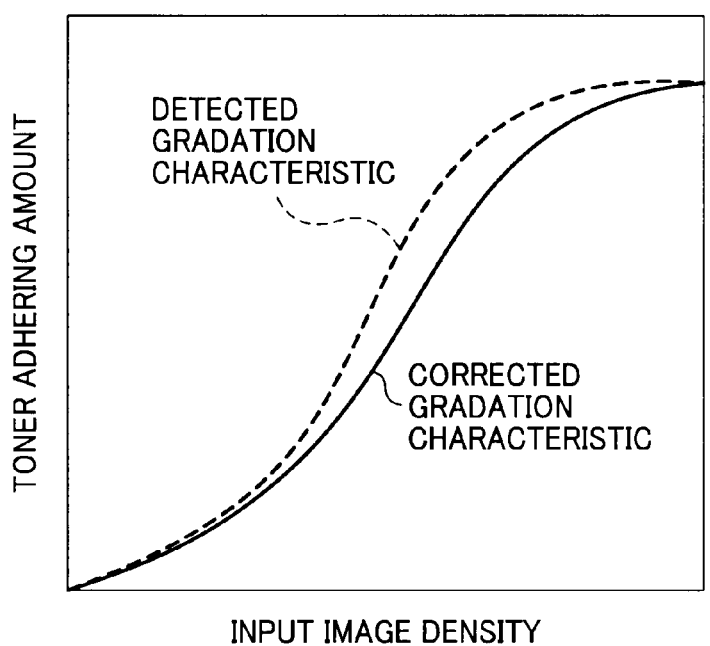

FIGS. 11A and 11B are graphs illustrating examples of gradation characteristics before and after the correction, FIG. 11A illustrating those before the correction and FIG. 11B illustrating those after the correction. As indicated by a solid line in FIG. 11A, by the changes in operating environment such as temperature and humidity and the changes of each image forming unit over time, the gradation characteristic of the apparatus is offset from the target characteristic indicated by a broken line. In this case, the toner adhering amount is larger in a halftone region with respect to the target characteristic, and the toner adhering amount is saturated in a high tone region, thereby not rendering the gradation properly. The correction is performed to correct such a gradation characteristic offset from the target characteristic so as to match the target characteristic as illustrated in FIG. 11B.

In the present embodiment, the toner adhering amount for the rows of area coverage modulation patterns is measured at the position on the intermediate transfer belt. However, the measurement may be made at the position on each image carrier or on the transfer conveying belt after transferring the patterns thereon.

All the conditions above are mere examples in the present embodiment, and all those conditions are appropriately adjusted for the gradation stability of the image forming apparatus to be used. The conditions to perform the correction control are not limited to when the power is turned on. The conditions may include the timings of the predetermined number of printouts, toner replacement, drum replacement, and a signal from an environmental sensor, and a way to select the pattern type may be changed depending on each of the conditions.

The gradation correction control according to the present embodiment is carried out after the process control is performed, in other words, it is carried out for the image forming apparatus that is assured of the target toner adhering amount. However, the gradation correction control alone may be performed.

In the correction control according to the present invention, the fact that the gradation correction is performed for only a single pattern type surely shortens the time required for the correction control compared with the conventional correction control. Furthermore, the fact that the gradation correction is performed for the most frequently used pattern type allows the gradation characteristics for the majority of printouts to be ensured.

Other ways to select the pattern type that make the user realize the gradation stability without causing dissatisfaction with the time required for gradation correction can be conceived.

For example, the correction control may be performed by selecting a pattern type from a plurality of pattern types implemented in the image forming apparatus in a predetermined sequence for each correction control.

FIG. 12 is a schematic diagram illustrating a method of selecting a pattern type in the image forming apparatus. An example of the image forming apparatus implemented with six pattern types of pattern type A to pattern type F will be explained here. In the image forming apparatus, the selecting order of the pattern types to correct from the pattern type A to the pattern type F is predetermined. In the example indicated in FIG. 12, the correction control is performed in the order of pattern types B, C, E, D, F, and A. The correction order of the pattern types may be determined by frequency of use, by prioritizing the pattern types for photographs, or with no particular intension. The correction control here is performed in the order as indicated in FIG. 12 with the pattern types B, C, and D as being for photographs. When the correction control is performed for the first time, the pattern type B is selected and the rows of area coverage modulation patterns are formed to correct the gradation characteristics for the pattern type B along the flow indicated in FIG. 6. The next time the correction control is performed, the pattern type C is selected and the rows of area coverage modulation patterns are formed to correct the gradation characteristics for the pattern type C. Similarly, the pattern types to correct are selected in the predetermined order, e.g., selecting the pattern type E for the correction control for the third time around and the pattern type D for the fourth time around, and the correction control for these types is performed. For the correction control for the seventh time around, returning to the beginning, the correction of the gradation characteristics for the pattern type B is performed.

In such configuration, the correction control can be performed for all the pattern types implemented in the image forming apparatus (six kinds in the present embodiment) without any bias. Furthermore, the fact that the correction control is performed for all the pattern types evenly allows the gradation characteristics to be assured even when printing a printout formed by a pattern type other than a commonly used pattern type.

Figure 13:
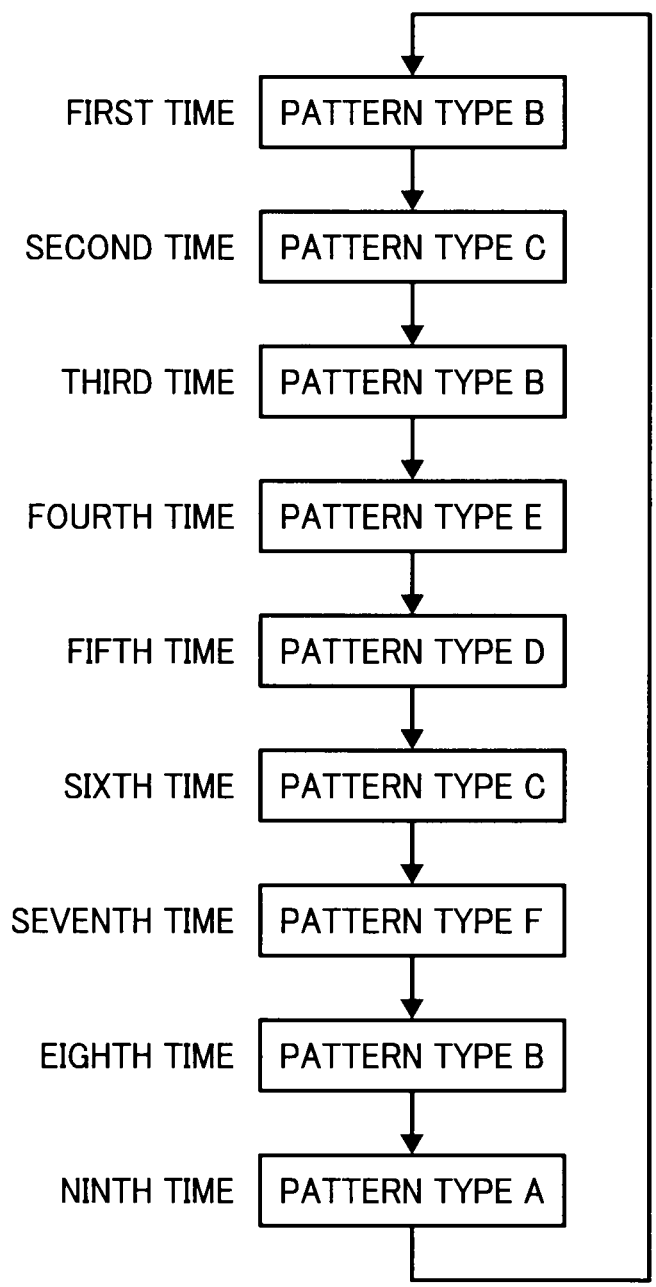
FIG. 13 is a schematic diagram for explaining another example of pattern selecting method.

In the present embodiment, while each of the multiple pattern types is selected once in a cycle, as in the selecting order of pattern types indicated in FIG. 13, the same pattern type may be selected more than once. The frequency of correction is set high for the pattern types that are frequently used and the gradation characteristics thereof fluctuate easily, and the frequency of correction is set low for the pattern types with gradation characteristics that hardly fluctuate, making it possible to perform the gradation correction in response to the request of the user.

Figure 14:
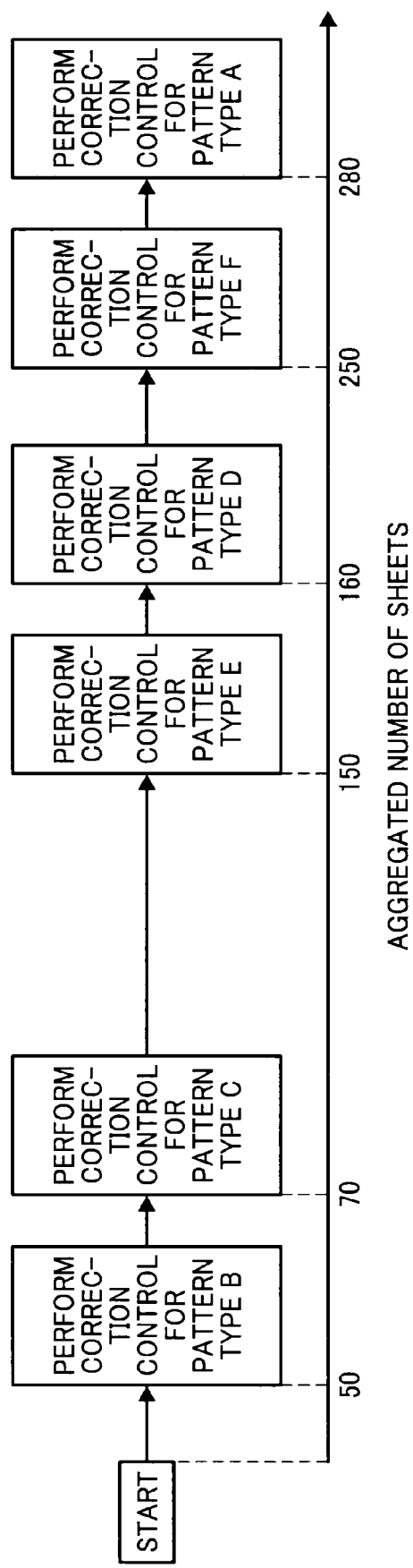
FIG. 14 is a schematic diagram for explaining timings of correction control performed by pattern types in the image forming apparatus.

In the present embodiment, the intervals of the correction control performed may not need to be constant. When the correction control is performed based on the predetermined number of sheets, as in the selecting order of pattern types indicated in FIG. 14, the timing of correction control performed may be set differently depending on the pattern type. In this case, although the gradation correction operation is frequently performed, because only the patterns of a single kind are formed for the rows of area coverage modulation patterns to carry out the correction, the correction control takes a short period of time. The condition to perform the correction control may be a period of time, in place of the number of sheets.

As another way to select pattern types, the pattern type may be fixed to the pattern type set as an initial setting. When the user outputs images, printing setting is seldom adjusted for each printing operation to output and the majority of printouts are output as set in the initial setting. The fact that the pattern type to correct is set as the pattern type set in the initial setting makes it possible to maintain the gradation stability for such printouts.

When printing in high volume using a pattern type that is hardly used in the previous print jobs, the gradation characteristics are not corrected unless the pattern type is selected in the last correction control. Therefore, the pattern type to which the correction control is performed can be preferably specified by the user. The fact that the user can optionally set the pattern type to be selected allows the correction control to be performed for the desired pattern type, thereby improving the degree of freedom of the correction control. It may also be configured that the user can freely determine the order of the pattern types to which the correction control is performed.

Figure 15:
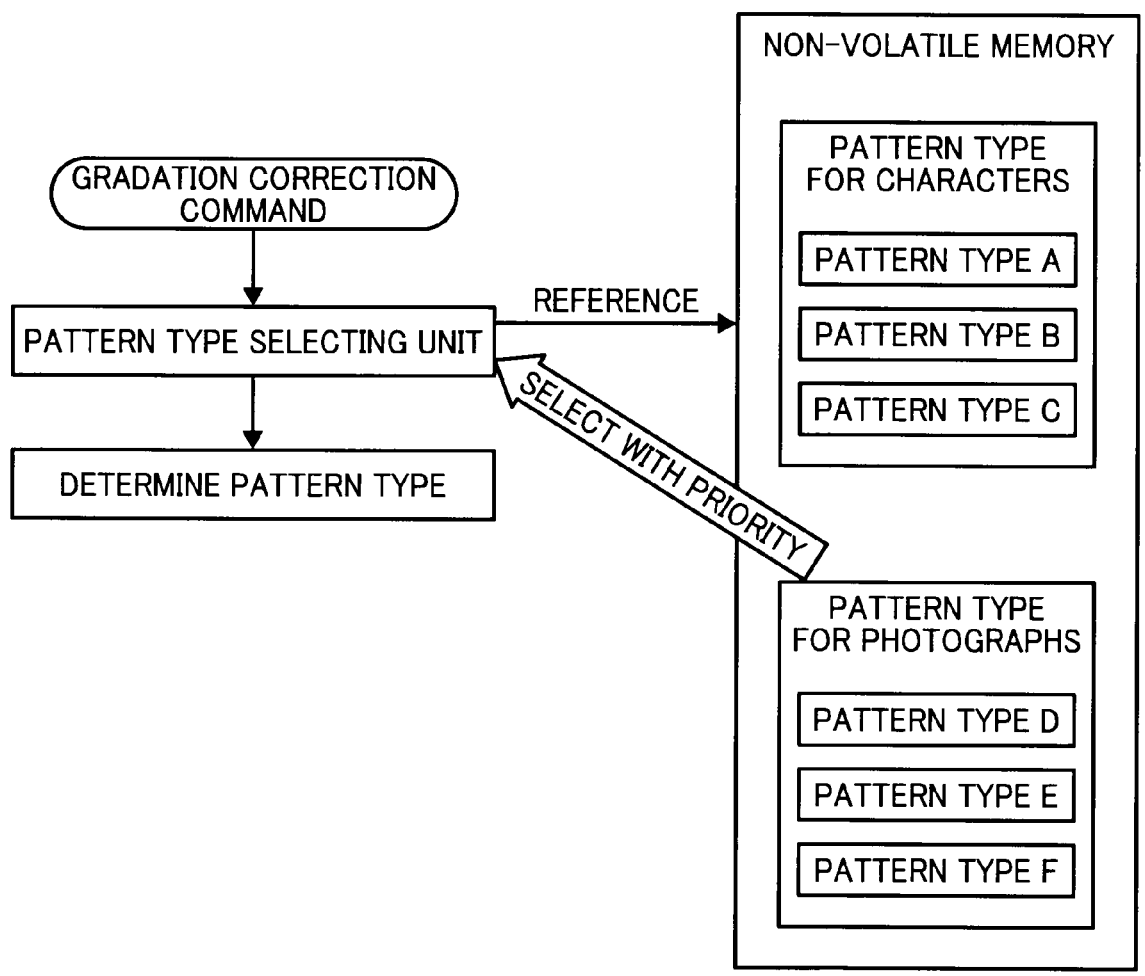
FIG. 15 is a schematic diagram for explaining still another example of pattern selecting method.

More importance is placed on gradation mainly for printouts of photographs and the like. If the result of selecting the highest frequency of use is the pattern type used for character strings, the gradation characteristics of the pattern type for photographs cannot be corrected. Accordingly, as indicated in FIG. 15, by selecting the pattern type based on the frequency of use from the pattern types for photographs, the gradation characteristics can be corrected for the printouts such as photographs for which more importance is placed on shades of colors and the like.

According to the present invention, selecting only a single pattern type as the pattern type to correct allows the time required for the correction control to be shortened and allows toner consumption to be reduced. In addition, not printing the rows of area coverage patterns on recording paper leads to save the waste of recording paper.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus that performs gradation correction, comprising:
    a pattern type selecting unit that selects a single pattern type to be formed on an image carrier from a plurality of pattern types, for gradation correction control, in the form of rows of area coverage modulation patterns on the image carrier;
    a pattern forming unit that forms, on the image carrier of the image forming apparatus, the rows of area coverage modulation patterns, the rows of area coverage modulation patterns having patterns of different gradation values in steps by an area coverage modulation method;
    toner adhering amount detecting circuitry that measures toner adhering amount of each pattern of the rows of area coverage modulation patterns formed on the image carrier; and
    $\gamma$ correction signal generation circuitry that generates a $\gamma$ correction signal based on a detection result of the toner adhering amount detecting circuitry, the $\gamma$ correction signal generation circuitry outputting the $\gamma$ correction signal as a same signal for gradation correction in copier section circuitry and for gradation correction in printer section circuitry,
    wherein the image forming apparatus performs the gradation correction after performing a target toner adhering amount assurance process, the target toner adhering amount assurance process including forming gradation patterns on the image carrier by sequentially switching charging bias and developing bias according to a predetermined timing, the formed gradation patterns are then detected by the toner adhering amount detecting circuitry, and control is performed based on the detected result of the adhering amount by the toner adhering amount detecting circuitry so that a target adhering amount is obtained.

2. The image forming apparatus according to claim 1, wherein the pattern type the pattern type selecting unit selects is a pattern type of a highest frequency of use subsequent to a most recently performed gradation correction control.

3. The image forming apparatus according to claim 2, wherein the selected pattern type of the highest frequency of use is a pattern type of a highest frequency of use among pattern types for photographs.

4. The image forming apparatus according to claim 1, wherein the pattern type the pattern type selecting unit selects is a pattern type in a predetermined order of the plurality of pattern types.

5. The image forming apparatus according to claim 1, wherein the pattern type the pattern type selecting unit selects is a pattern type set in an initial setting.

6. The image forming apparatus according to claim 1, wherein the pattern type the pattern type selecting unit selects is settable by a user.

7. The image forming apparatus according to claim 1, wherein a number of gradation scales for each row of area coverage modulation patterns is ten.

8. The image forming apparatus according to claim 1, wherein a first row of the rows of area coverage modulation patterns includes all non-black patterns, and a second row of the rows of area coverage modulation patterns includes all black patterns.

9. The image forming apparatus according to claim 1, further comprising:
copier section circuitry which includes first γ correction circuitry for copying and is configured to control an image forming unit for a copier image; and
printer section circuitry which includes second γ correction circuitry for printing and is configured to control the image forming unit for a printer image,
wherein the first and second γ correction circuitry are configured to receive said γ correction signal for the respective gradation correction associated with the copier section circuitry and the gradation correction associated with the printer section circuitry.

10. The image forming apparatus according to claim 1, wherein the image carrier is an endless belt, and said toner adhering amount detecting circuitry includes a black toner amount adhering sensor and a color toner amount adhering sensor arranged in a same line perpendicular to a belt conveying direction of said endless belt.

11. The image forming apparatus according to claim 1, wherein the rows of area coverage modulation patterns consist of a first row and a second row, each arranged in a conveying direction of the image carrier, the first row including all non-black patterns of the area coverage modulation patterns, and the second row including only black patterns of the area coverage modulation patterns.

12. The image forming apparatus according to claim 1, wherein the gradation correction is not based on forming the area coverage patterns on recording paper.

13. A method for gradation correction, comprising:
selecting a single pattern type to be formed on an image carrier from a plurality of pattern types, for carrying out gradation correction control, by forming rows of area coverage modulation patterns on the image carrier;
forming, on the image carrier, the rows of area coverage modulation patterns having patterns of different gradation values in steps by an area coverage modulation method;
measuring toner adhering amount of each pattern of the rows of area coverage modulation patterns formed on the image carrier; and
performing gradation correction based on a receipt of a same γ correction signal that is generated based on said measuring toner adhering amount for the modulation patterns, the same γ correction signal being for gradation correction in copier section circuitry and for gradation correction in printer section circuitry,
wherein said gradation correction is performed after performing a target toner adhering amount assurance process, the target toner adhering amount assurance process including forming gradation patterns on the image carrier by sequentially switching charging bias and developing bias according to a predetermined timing, the formed gradation patterns then being detected as an adhering amount result, and control being performed based on the detected result of the adhering amount so that a target adhering amount is obtained.

14. The method according to claim 13, wherein a number of gradation scales for each row of area coverage modulation patterns is ten, with the gradation scales increase in gradation value from the first scale to the tenth scale.

15. The method according to claim 13, wherein a first row of the rows of area coverage modulation patterns includes only non-black patterns, and a second row of the rows of area coverage modulation patterns includes only black patterns.

* * * * *